United States Patent [19]

Tomerlin et al.

[11] Patent Number: 5,268,796
[45] Date of Patent: Dec. 7, 1993

[54] POWERED VEHICLE MIRROR

[76] Inventors: Reg Tomerlin, 2330 - 2nd Ave., Corona Del Mar, Calif. 92625; Edward A. Chambers, 3261 Moritz, Huntington Beach, Calif. 92647

[21] Appl. No.: 949,406

[22] Filed: Sep. 22, 1992

[51] Int. Cl.[5] .................... G02B 7/182; B60R 1/02
[52] U.S. Cl. .................... 359/871; 359/873; 359/877; 248/486
[58] Field of Search ............ 359/841, 843, 872, 873, 359/874, 876, 877, 371; 248/479, 480, 482, 486

[56] References Cited

U.S. PATENT DOCUMENTS

| | | | |
|---|---|---|---|
| 2,854,892 | 10/1958 | Stark | 359/843 |
| 4,190,326 | 2/1980 | Brodbeck | 359/877 |
| 4,456,333 | 6/1984 | Hewitt | 359/877 |
| 4,988,179 | 1/1991 | Stensland | 359/877 |
| 5,111,341 | 5/1992 | Keast | 359/843 |

*Primary Examiner*—Martin Lerner
*Assistant Examiner*—John Juba, Jr.
*Attorney, Agent, or Firm*—Roy A. Ekstrand

[57] ABSTRACT

A powered vehicle mirror includes a support shaft securable to a pair of support brackets in a fixed attachment. A mirror housing supports a mirror and defines an interior cavity through which the support shaft extends. A bidirectional motor and speed reduction gear mechanism is coupled to a rotatable threaded shaft having a pair of threaded shuttles supported thereby. A multiple arm linkage mechanism is coupled between the threaded shuttles and the support shaft such that rotation of the threaded shaft during motor energizing causes the threaded shuttles to be drawn closer together or spread farther apart and produce a rotational force against the support shaft which operates to pivot the mirror. A solenoid brake mechanism is operative to captivate a brake plate and prevents run-on or overshoot during mirror angular changes. In an alternate embodiment, a threaded shaft is driven by the motor and speed reduction unit and receives a single threaded shuttle which is coupled to a stationary support shaft to provide rotational motion of the powered mirror. In an still further alternate embodiment, a frictional brake mechanism is continuously operative to minimize overshoot and run-on of the powered mirror during rotation.

13 Claims, 2 Drawing Sheets

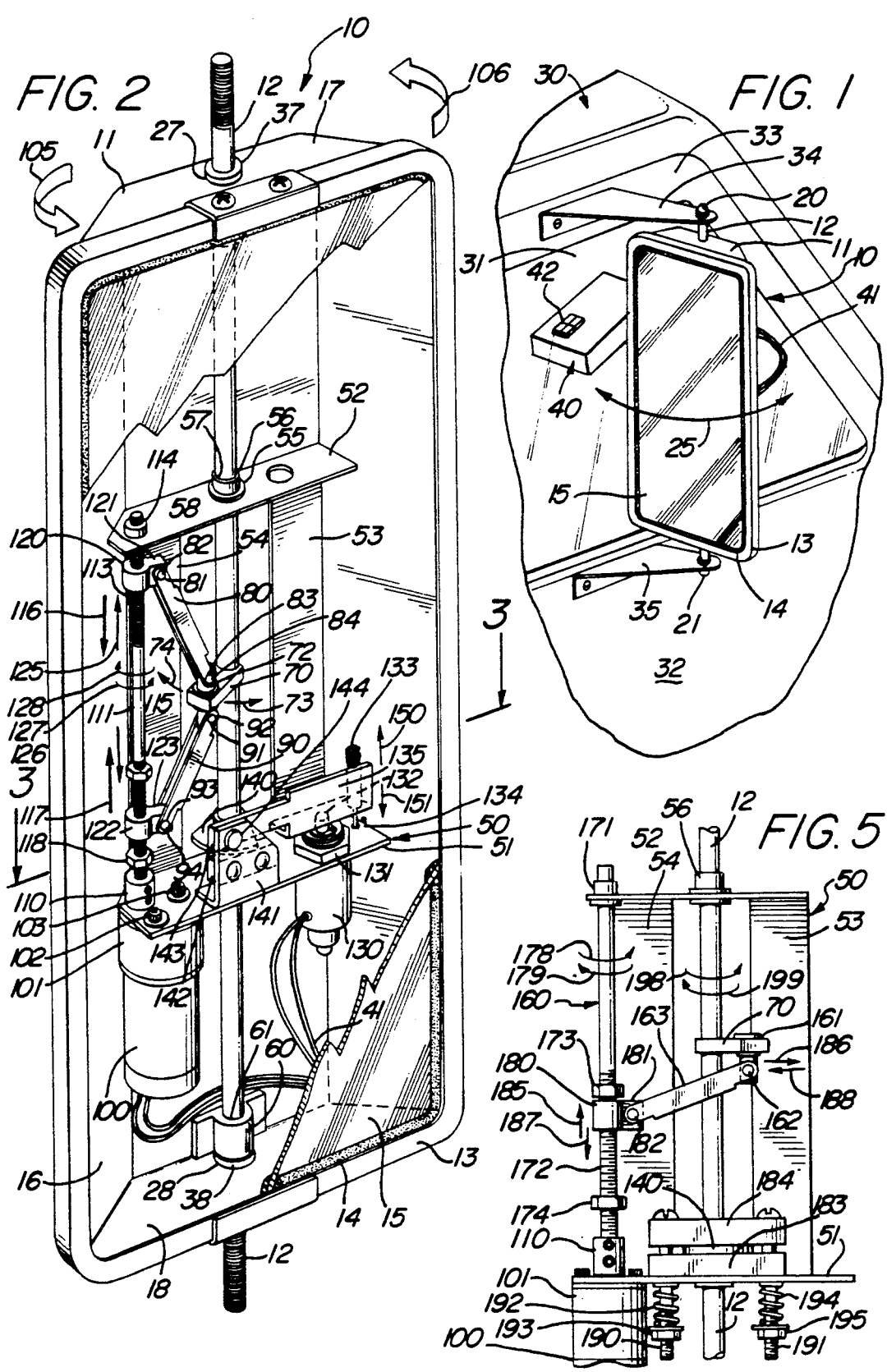

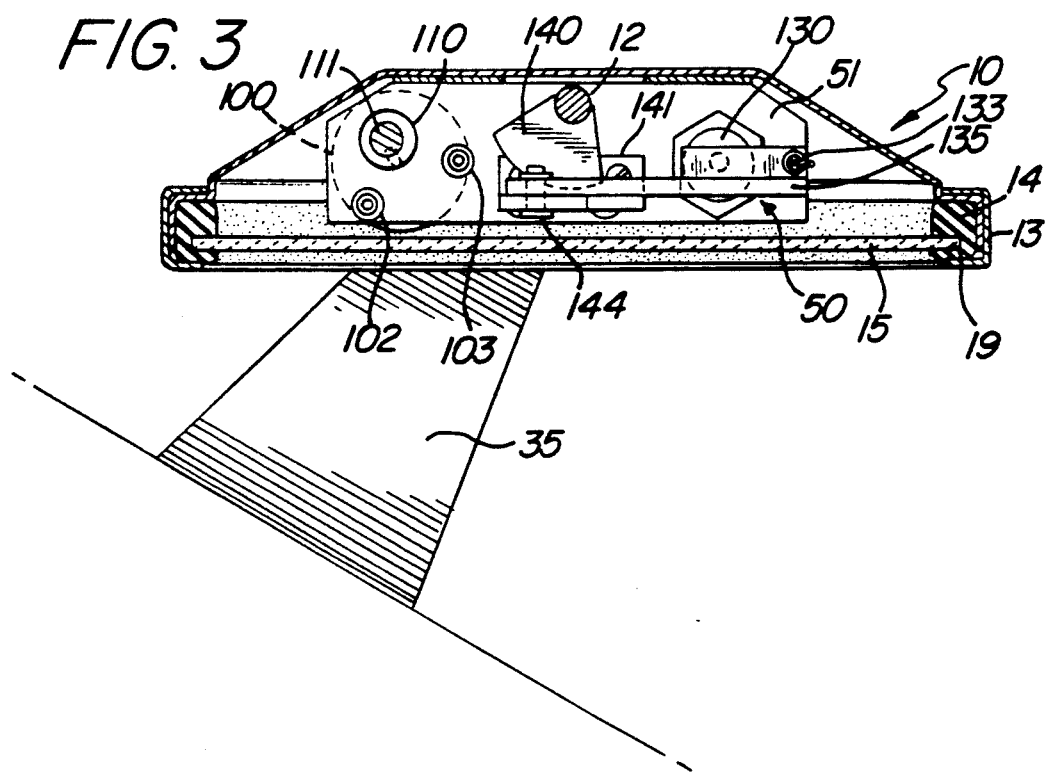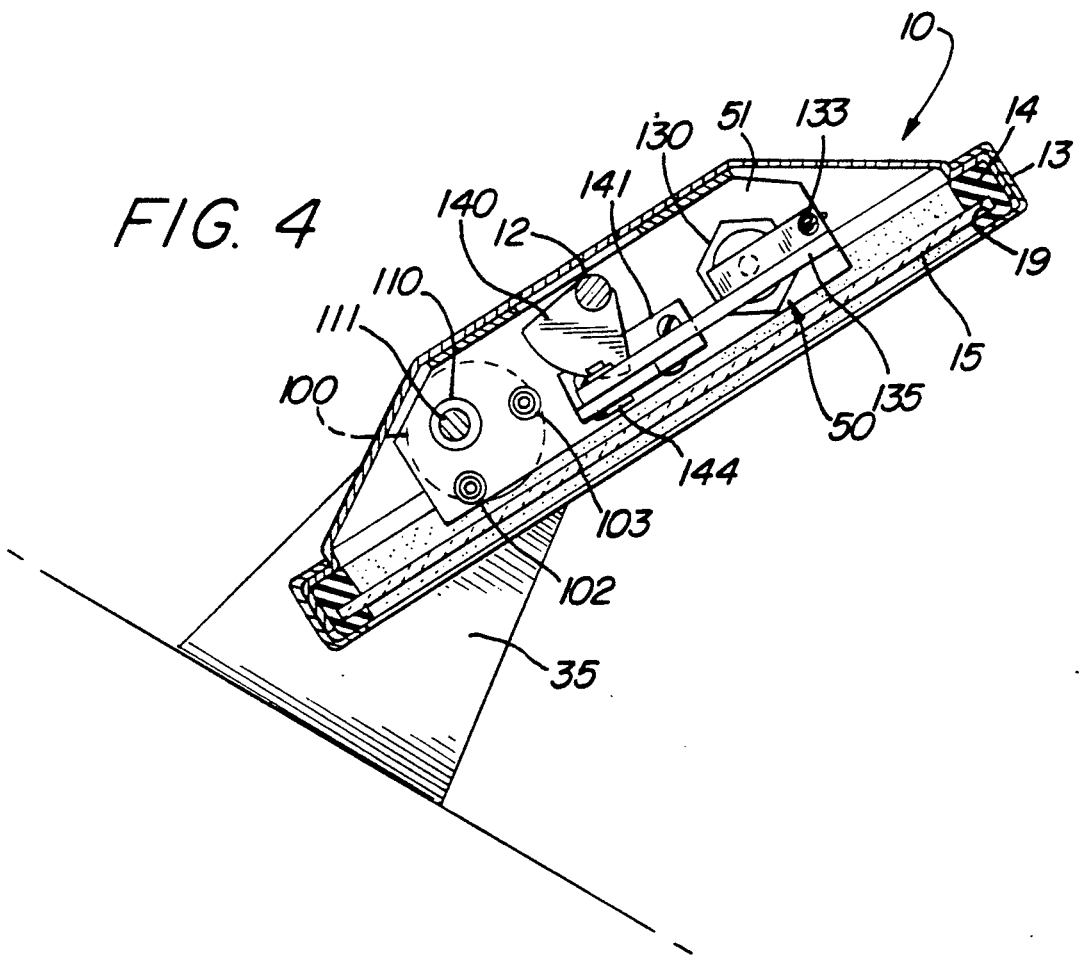

POWERED VEHICLE MIRROR

FIELD OF THE INVENTION

This invention relates generally to vehicle mirrors and particularly to powered vehicle mirrors of the type used on trucks or similar vehicles.

BACKGROUND OF THE INVENTION

External rear view mirrors have been provided on trucks and similar vehicles for a great many years. Such mirrors are a familiar sight generally comprising a pair of elongated vertically oriented mirrors on each side of the vehicle cab and supported by a pair of support structures often having a number of bracing elements. These mirrors are generally utilized to provide driver vision along each side of the vehicle and for a vision angle extending outwardly from the vehicle. Because different drivers having different height and seating positions require correspondingly different mirror positions to properly utilize such mirrors, an adjustable support is used in coupling each mirror to its respective support structure. The process of manually adjusting such mirrors is difficult and often tedious. The passenger side mirror in particular requires repeated attempts on the driver's part to adjust the mirror and return to the driver's seat to determine proper mirror adjustment. Generally, several such cycles are required before the mirrors are finally adjusted to suit a particular driver. Of course, the next driver operating the vehicle then carries forward an adjustment process which is no longer suited to the original driver. The end result is a tiresome process for each driver upon assuming operating control of the vehicle.

In many "backing" and "cornering" maneuvers, the trailer moves out of the field of view making the standard, unpowered mirror useless of observing the rear of the trailer.

The difficulties and effort required by drivers in adjusting such vehicle mirrors has prompted practitioners in the art to provide power adjustable mirrors for trucks and similar vehicles. The basic function of such powered mirrors is similar to that provided for automobiles and the like in that a drive motor such as a two direction DC motor is coupled to the mirror through an operative mechanism and to a driver accessible control unit. The intent is to provide mirror movement in response to operator control and avoid the need for repeatedly moving about the truck cab and its exterior in order to properly adjust the vehicle mirrors.

While the basic idea of power adjustable mirrors is of great promise and highly desirable to operators of trucks and similar vehicles, the presently available units provided by practitioners in the art are subject to several significant problems and limitations. For example, the drive mechanisms used to operate such mirrors have, to date, often proven to be rough or uneven in their motion response which renders adjustment erratic and difficult. In addition, such powered mirrors are often subject to irritating overshoot characteristics in which the drive mechanism "runs on" in a given direction for a brief interval once the control is released. The renders adjustment somewhat vexing and requires repeated driver involvement. In addition to adjustment problems, the presently available powered mirrors for trucks and similar vehicles are often subject to mirror movement or severe damage when an impact is imparted to the mirror from objects such as tree branches, persons walking to close to the vehicle or other inadvertent contact with the mirror. In addition, the durability and reliability of presently available mirrors for trucks or similar vehicles is far less than desired causing such mirrors to become a source of frequent repair problems.

The limited utility of existing powered mirrors combined with their high cost has kept the unpowered, manually adjustable mirror in the great majority of use. The need for greater vehicle safety has created the limited existing market for powered mirrors.

There remains, therefore, a need in the art for evermore improved powered vehicle mirrors of the type suitable for use on trucks and other vehicles.

SUMMARY OF THE INVENTION

Accordingly, it is a general object of the present invention to provide an improved powered vehicle mirror. It is a more particular object of the present invention to provide an improved powered vehicle mirror which provides even movement with a virtual absence of overshoot characteristic and which is resistant to damage or mirror movement due to impacts or inadvertent contact.

In accordance with the present invention, there is provided a powered vehicle mirror comprising: a housing defining an interior cavity; a support shaft extending through the interior cavity and having end portions attachable to a vehicle; a drive motor supported within the interior cavity; and drive coupling means including a threaded shaft rotated by the drive motor, a first threaded shuttle received upon the threaded shaft and linkage means coupled between the first threaded shuttle and the support shaft pivoting the housing in response to operation of the drive motor.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a powered vehicle mirror constructed in accordance with the present invention and secured to a typical vehicle installation;

FIG. 2 sets forth partially section view of a powered vehicle mirror constructed in accordance with the present invention;

FIGS. 3 and 4 set forth sequential section views of the present invention powered vehicle mirror at different movement angles; and FIG. 5 sets forth a partial section view of an alternate embodiment of the present invention powered vehicle mirror.

DESCRIPTION OF THE PREFERRED EMBODIMENT

FIG. 1 sets forth a perspective view of a powered vehicle mirror constructed in accordance with the present invention and generally referenced by numeral 10. Mirror 10 includes an elongated housing 11 having a generally rectangular bezel 13 supporting a gasket 14 and an elongated generally rectangular mirror 15. A support shaft 12 extends vertically through housing 11 and provides the sole support for mirror 10. Mirror 10 is shown secured to a typical truck or similar vehicle having a cab portion 30. Vehicle cab 30 includes a door 32 having an upwardly extending window frame 33 and supporting a conventional vehicle side window 31. An upper support bracket 34 and a lower support bracket 35 are secured to window frame 33 and door 32 respectively. While not seen in FIG. 1, upper bracket 34 and lower bracket 35 each define respective apertures which receive upper and lower ends respectively of support shaft 12. A pair of cap nuts 20 and 21 are threadably received upon the ends of support shaft 12 to secure shaft 12 to brackets 34 and 35 and maintain the position of powered mirror 10. It will be understood by those skilled in the art that upper bracket 34 and lower bracket 35 are merely illustrative and the present invention powered mirror is operable in any type of support bracket combination with the essential aspect being the secure coupling between the end portions of support shaft 12 to the supporting vehicle mirror brackets.

Powered mirror 10 further includes a control unit 40 preferably supported within the interior of vehicle cab 30 and having a plurality of manually operable control inputs 42. A plurality of control wires 41 provide electrical coupling between control unit 40 and the operative control mechanism within powered mirror 10 (seen in FIG. 2).

In operation and by means set forth below in greater detail, the angular position of powered mirror 10 is adjustable by the user in manipulating manual controls 42 to provide angular rotation of powered mirror 10 with respect to support shaft 12 in the directions indicated by arrows 25. Alternatively, control unit 40 may also include means for responding to automated position input information to provide a corresponding set of information signals and electrical control signals to powered mirror 10 via control wires 41. In either event, the angular position of mirror 10 is controlled solely by the electrical signals applied to control wires 41 causing the operative mechanism within powered mirror 10 set forth below to respond with corresponding angular position adjustments.

FIG. 2 sets forth a partially sectioned view of the present invention powered vehicle mirror. As described above, mirror 10 includes an elongated housing 11 supporting an elongated rectangular bezel 13. Bezel 13 receives a resilient gasket 14 which in turn resiliently and sealingly supports a mirror 15.

Housing 11 further defines an interior cavity 16, an upper surface 17 and a lower end surface 18. End surface 17 defines an aperture 27 while end surface 18 defines an aperture 18. Support shaft 12 defines an elongated cylindrical shaft having threaded end portions and extending through interior cavity 16 and apertures 27 and 28 of end surfaces 17 and 18 respectively. A bearing 60 defines a bearing passage 61 and is secured to the lower end of housing 11. Shaft 12 passes through bearing passage 61 such that bearing 60 provides a pivotal bearing permitting housing 11 to pivot or rotate about shaft 12. Thus, in accordance with the above-described attachment, shaft 12 is securely attached to the support brackets of the host vehicle while housing 11 is pivotally movable with respect to support shaft 12.

A bracket 50 includes a pair of horizontal plates 51 and 52 secured to a pair of vertical supports 53 and 54. Supports 53 and 54 are secured to the rear surface of housing 11 such that plates 51 and 52 extend horizontally within interior cavity 16 of housing 11. Plate 52 defines an aperture 55 receiving a bearing 56 therein. Bearing 56 in turn defines a bearing passage 57 which receives support shaft 12 in a similar fashion to that set forth below for bearing 60. Thus, bearing 56 cooperates with bearing 60 to provide the above-described pivotal attachment between housing 11 and support shaft 12. Plate 52 further defines an aperture 58 which receives and supports a bearing 114.

Plate 51 receives and supports a brake solenoid 130 having a support nut 131 and an upwardly extending solenoid rod 132. An L-shaped flange 141 is secured to the upper surface of plate 51 and supports a horizontally extending brake pad 142. Flange 141 further includes a pivot pin 144. A horizontally extending brake arm 135 is pivotally secured to pivot 144 and supports a horizontally disposed brake pad 143. Brake arm 135 further includes a brake spring 133 coupled to an aperture 134 formed in bracket 50. Spring 133 is operative to urge brake arm 135 to pivot downwardly about pivot 144 in the direction indicated by arrow 151. A circular segment brake plate 140 is secured to support shaft 12 and extends outwardly therefrom between brake pads 142 and 143. The spacing between brake pads 142 and 143 is controlled by the pivotal motion of brake arm 135 about pivot 144. Solenoid rod 132 of brake solenoid 130 contacts the undersurface of brake arm 135 and thus when brake solenoid 130 is deenergized, solenoid rod 132 is retracted into the body of brake solenoid 130. As a result, a force of spring 133 upon brake arm 135 in the direction indicated by arrow 151 causes brake plate 140 to be captivated between brake pads 142 and 143. The braking action thus provided prevents pivotal motion of housing 11 with respect to support shaft 12 and maintains the angular position of mirror 10.

Conversely, when brake solenoid 130 is energized, solenoid rod 132 extends upwardly from solenoid 130 overcoming the force of spring 133 and pivoting brake arm 135 upwardly in the direction indicated by arrow 150. The upward pivotal motion of brake arm 135 separates brake pads 142 and 143 and releases brake plate 140. As a result, housing 11 is able to then pivot with respect to support shaft 12.

A speed reduction gear unit 101 is coupled to plate 51 by a pair of conventional fasteners 102 and 103. A bidirectional DC motor 100 is operatively coupled to gear reduction unit 101. The output of gear reduction unit 101 includes an output coupler 110 which receives and is secured to a threaded shaft 111. The remaining end of shaft 111 is rotatably supported by bearing 114 at plate 52. Shaft 111 includes an upper threaded portion 113 and a lower threaded portion 112. A pair of threaded shuttles 120 and 122 include a respective pair of extending tabs 121 and 123 respectively. A linkage arm 80 defines an aperture 81 receiving a pivot pin 82 to provide pivotal attachment to tab 121 of shuttle 120. The remaining end of arm 80 defines an aperture 83 receiving a pin 84 to provide a pivotal attachment between arm 80 and post 72. Similarly, arm 90 defines an aperture 93 at one end receiving a pin 94 providing a pivotal attachment to tab 123 of shuttle 122. Arm 90 further includes an aperture 91 receiving a pin 92 providing pivotal attachment of arm 90 to post 72. A pair of threaded limit stop nuts 115 and 118 are threadably received upon threaded portion 112 of shaft 111.

A plurality of control wires 41 provide electrical coupling between brake solenoid 130 and motor 100 to control unit 40 (seen in FIG. 1). While not shown in FIG. 2, it will be apparent to those skilled in the art that control wires 41 extend through housing 11 at a convenient aperture with appropriate sealing apparatus (not shown).

In operation, the user's manipulation of manual control 42 of control unit 40 (seen in FIG. 1) provides electrical signals to control wires 41 which energize solenoid 130 and motor 100. The energizing of solenoid 130 forces solenoid rod 132 upwardly in the direction indicated by arrow 150 pivoting brake arm 135 in the manner described above and releasing brake plate 140. With brake plate 140 released, the energizing of motor 100 causes a rotation of output coupler 11 which in turn rotates threaded shaft 111. The rotation of threaded shaft 111 causes movement of threaded shuttles 120 and 122. In accordance with the preferred form of the present invention, threaded portion 113 and threaded portion 112 are oppositely threaded such that rotation of shaft 111 produces opposite direction motions of threaded shuttles 120 and 122. Thus, the rotational motion of output coupler 110 and threaded shaft 111 in the direction of arrow 127, for example, draws threaded shuttle 122 downwardly in the direction of arrow 126 while simultaneously driving threaded shuttle 120 upwardly in the direction indicated by arrow 125. As threaded shaft 111 continues to rotate in the direction of arrow 127, the separation between threaded shuttles 120 and 122 continues to increase producing a drawing force upon arm 70 in the direction indicated by arrow 74. As mentioned above, the positions of support shaft 12 and arm 70 are maintained in a stationary attachment to the support brackets of the host vehicle. As a result, support shaft 12 and arm 70 are immovable and the force coupled between arms 80 and 90 against arm 70 in the direction of arrow 74 causes mirror 10 to pivot about shaft 12 in the direction indicated by arrow 105. This pivotal motion continues so long as solenoid 130 and motor 100 are energized and threaded shaft 111 rotates in the direction indicated by arrow 127. Thus, the angular position of mirror 10 changes while the position of support shaft 12 remains fixed. Limited stop 118 remains at a fixed position upon threaded portion 112 of shaft 111. Thus, as threaded shuttle 122 is brought into contact with limit stop 118, further motion of shuttle 122 is precluded and a stopping force is applied to shaft 111 which precludes the further motion of mirror 10 in the direction of arrow 105. Under most circumstances, however, the angular position of mirror 10 in the direction of arrow 105 is stopped short of that corresponding to limit stop 118. Thus, at some point prior to the contact of threaded shuttle 122 and limit stop 118, the user may stop further rotation of mirror 10 in the direction indicated by arrow 105 by ceasing the energizing of brake solenoid 130 and motor 100. In accordance with an important aspect of the present invention, the position of mirror 10 at the time the energizing of motor 100 has been interrupted is quickly secured by the action of brake solenoid 130. Once brake solenoid 130 is no longer energized, solenoid rod 132 is retracted and spring 133 forces brake arm 134 downwardly in the direction of arrow 151. Correspondingly, brake arm 135 pivots about pivot 144 grasping brake plate 140 between brake pads 142 and 143. As a result, the normal tendency for motor 100 and gear reduction unit 101 to "run on" or continue moving due to the momentum of moving parts within motor 100, gear reduction unit 101 as well as threaded shaft 111 is precluded. Thus, as the user reaches the desired angular position and manipulates manual control 42 (seen in FIG. 1) appropriately mirror 10 stops quickly and reliably at the selected position. Thereafter, in the absence of energizing of brake solenoid 130 or motor 100, the position of mirror 10 remains secure due to the captivation of brake plate 140 between brake pads 142 and 143. In addition, the linkage provided by threaded shuttles 120 and 122 and threaded shaft 111 resists pivotal motion of mirror 10 about shaft 12 due to external forces applied to mirror 10 which in turn further secures the position of mirror 10.

In the event the user operates control unit 40 so as to rotate threaded shaft 111 in the direction indicated by arrow 128, threaded shuttle 120 is drawn downwardly in the direction indicated by arrow 116 while threaded shuttle 122 is driven upwardly in the direction indicated by arrow 117. The combined motion of threaded shuttles 120 and 122 in the directions of arrows 116 and 117 imparts a force upon arm 70 coupled through arms 80 and 90 in the direction indicated by arrow 73. Once again with shaft 12 firmly secured, the force applied to arm 70 in the direction indicated by arrow 73 produces a pivotal motion of mirror 10 about shaft 12 in the direction indicated by arrow 106. This pivotal motion continues so long as solenoid 130 and motor 100 are energized. Once the user has positioned mirror 10 in the desired angular position, the interruption of the energizing of brake solenoid 130 and motor 100 interrupts the rotation of shaft 111 and pivots brake arm 135 downwardly in the direction indicated by arrow 151 captivating brake plate 140 between brake pads 142 and 143. The captivation of brake pad 140 as solenoid 130 is deenergized abruptly stops the pivotal motion of mirror 10 and secures the angular position of mirror 10. Limit stop 115 is positioned upon threaded portion 112 of shaft 111 to provide a limit stop for motion of threaded shuttle 122 in the direction of arrow 117 which corresponds to the desired angular travel limit in the direction of arrow 106 preferred by the user.

It will be appreciated by those skilled in the that the coupling mechanism provided by threaded shaft 111, shuttles 120 and 122 together with arms 70, 80 and 90 permit the present invention powered mirror to resist movement and damage when external forces are applied to the mirror which would otherwise cause mirror 10 to be pivoted about shaft 12. More specifically, forces applied to mirror 10 of a pivotal nature are coupled by arms 70, 80 and 90 in a manner which produces either spreading forces in the directions of arrows 125 and 126 upon shuttles 120 and 122 or converging forces in the directions indicated by arrows 116 and 117. In either case, threaded shuttles 120 and 122 together with threaded shaft 111 form, in essence, a "worm gear" type coupling which resists such forces since no rotational component is applied to shaft 111. In accordance with an important aspect of the present invention, this coupling arrangement not only resists undesired movement of the mirror but also tends to isolate the often fragile gear reduction mechanism from damaging forces.

FIGS. 3 and 4 set forth sequential section views of powered mirror 10 at different angular position taken along section lines 3—3 in FIG. 2. As described above, mirror 10 includes a housing 11 defining an interior cavity 16. Mirror 10 further includes a rectangular bezel 13 having a resilient gasket 14 secured therein. Gasket 14 defines a groove 19 which receives and supports mirror 15. An elongated cylindrical shaft 12 extends through interior cavity 16 of housing 11 and is secured to vehicle cab 30 by a pair of brackets 34 and 35 (seen in FIG. 1). A horizontal plate 51 supported within interior cavity 16 receives and supports a flange 141 having a pivotal attachment 144 and a brake arm 135 pivotally secured to flange 141. A spring 133 is coupled between plate 51 and brake arm 135. A brake solenoid 130 is supported by plate 51 and is operatively coupled to brake arm 135 in the manner described above. A circular section brake plate 140 is secured to shaft 12 and extends between brake pads 142 and 143 (seen in FIG. 2). A bidirectional motor 100 is supported by plate 51 and is secured thereto by a pair of fasteners 102 and 103. An output coupler 110 receives and supports a threaded shaft 111.

With simultaneous reference to FIGS. 3 and 4, it should be noted that the above-described angular rotation produced by energizing motor 100 and brake solenoid 130 causes mirror 10 to pivot about shaft 12 changing the angular position of mirror 10.

FIG. 5 sets forth a partially sectioned alternate embodiment of the present invention powered mirror generally referenced by numeral 160. Mirror 160 utilizes a housing bezel gasket and mirror identical to that utilized above by powered mirror 10. In addition, powered mirror 160 utilizes a support shaft 12 having an arm 70 and threaded end portions for attachment to the mirror support brackets which is also identical to that utilized by mirror 10 and described above. Mirror 160 further utilizes a bracket 50 having a pair of spaced horizontal plates 51 and 5 also generally identical to that utilized by mirror 10 and shown and described above. The differences between powered mirror 160 and powered mirror 10 are found primarily in the brake mechanism operative upon brake plate 140 and the coupling linkage operative upon arm 70.

More specifically, a pair of brake pads 183 and 184 are secured to plate 51 by a pair of fasteners 190 and 191. Fasteners 190 and 191 receive a corresponding pair of threaded nuts 193 and 195. A pair of coil springs 192 and 194 are compressively captivated between nuts 193 and 195 and the underside of plate 51. Brake plate 140 is secured to support shaft 12 in the manner described above and is captivated between brake pads 183 and 184. The force provided by springs 192 and 194 draws brake pad 184 against brake plate 140 and brake pad 183. As a result, a frictional force is imposed upon brake plate 140 which resists rotational motion of shaft 12. The strength of this resisting force is controlled by the positions of nuts 193 and 195 upon fasteners 190 and 191 respectively. The objective of brake pads 183 and 184 and the spring force units coupled thereto is to provide a resisting force which must be overcome to rotate powered mirror 160 with respect to shaft 12 and which is operative to avoid the above-described "running on" or overshoot which would otherwise occur as powered mirror 160 is operated.

In contrast to the embodiment set forth above in FIGS. 1 through 4, powered mirror 160 utilizes a threaded shaft 170 secured at one end to a bearing 171 and coupled to an output coupler 110 which defines a single threaded portion 172. Gear reduction unit 101 and motor 100 are coupled to output coupler 110 in the manner described above. A threaded shuttle 180 is threadably received upon threaded portion 172 of shaft 170. A pair of limit stops 173 and 174 are positioned on either side of threaded shuttle 180 and operate to limit the travel in each direction of shuttle 180.

In operation, motor 100 is energized to provide rotation of output coupler 110 and threaded shaft 170. If, for example, motor 100 is energized so as to rotate shaft 170 in the direction indicated by arrow 178, threaded shuttle 180 is drawn downwardly in the direction indicated by arrow 187. The downward force upon threaded shuttle 180 is coupled to arm 70 by a connecting arm 173 producing a drawing force upon arm 70 in the direction indicated by arrow 188. This drawing force produces a rotational force between powered mirror 160 and shaft 12 which overcomes the frictional coupling between brake pads 183 and 184 and brake pad 140. As a result, powered mirror 160 is rotated about shaft 12 in the direction indicated by arrow 198. Once the desired position of powered mirror 16 has been obtained, the user terminates the energizing of motor 100 and the frictional force provided by brake pads 183 and 184 against brake plate 140 abruptly stops the pivotal motion of powered mirror 16.

In the event mirror 100 is energized so as to rotate threaded shaft 170 in the direction indicated by arrow 179, threaded shuttle 180 is forced upwardly in the direction of arrow 185 producing a force coupled to arm 70 by arm 163 in the direction indicated by arrow 186. Once again with shaft 12 maintained in a fixed attachment as described above, the force in the direction of arrow 186 overcomes the frictional force of brake pads 183 and 184 against brake plate 140 causing powered mirror 160 to be rotated about shaft 12 in the direction indicated by arrow 199. This rotation continues until the energizing of motor 100 is again interrupted at which point the frictional force upon brake plate 140 of brake pads 183 and 184 brings the pivotal motion of mirror 160 to an abrupt halt. Limit stops 173 and 174 limit the travel of shuttle 180 upon threaded portion 172 in the manner described above and thus provide travel limits for the rotational motion of mirror 160.

What has been shown is a powered vehicle mirror which utilizes a threaded shaft and threaded shuttle coupling mechanism to provide effective pivotal motion of the powered mirror while isolating the motor and drive mechanism from undesired and damaging forces due to external impacts against the mirror. The position of the mirror is maintained by a brake mechanism together with the use of a threaded drive shaft and threaded shuttle coupling. System overshoot or run-on is avoided by the use of a braking mechanism which quickly stops the motion of the mirror once the drive mirror is no longer energized.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A powered vehicle mirror comprising:
 a housing supporting a mirrored element and defining an interior cavity;
 a support shaft extending through said interior cavity and having end portions attachable to a vehicle;
 brake means for imparting a braking force between said housing and said support shaft to resist pivotal motion of said housing;
 a drive motor supported within said interior cavity; and drive coupling means including a threaded shaft rotated by said drive motor, a first threaded shuttle received upon said threaded shaft and linkage means coupled between said first threaded shuttle and said support shaft pivoting said housing in response to operation of said drive motor.

2. A powered vehicle mirror as set forth in claim 1 wherein said linkage means includes a first arm extending from said support shaft and a second arm having a first end pivotally coupled to said first arm and a second end pivotally coupled said first threaded shuttle.

3. A powered vehicle mirror as set forth in claim 2 wherein said threaded shaft defines first and second oppositely threaded portions and wherein said first threaded shuttle is received upon said first threaded portion.

4. A powered vehicle mirror as set forth in claim 3 further including a second threaded shuttle received upon said second threaded portion of said threaded shaft and a third arm having a third end pivotally coupled to said first arm and a fourth end pivotally coupled to said second threaded shuttle.

5. A powered vehicle mirror as set forth in claim 4 wherein said brake means includes:
- a brake plate extending outwardly from said support shaft;
- a pair of brake pads supported on opposite sides of said brake plate; and
- means for captivating said brake plate between said brake pads.

6. A powered vehicle mirror as set forth in claim 5 wherein said means for captivating includes: a pivotal arm supporting one of said brake pads; a spring urging said pivotal arm toward closure of said brake pads; and a solenoid operative when energized to pivot said pivotal arm away from closure of said brake pads.

7. A powered vehicle mirror as set forth in claim 5 wherein said means for captivating includes spring means coupled between said brake pads to force said brake pads against said brake plate.

8. A powered vehicle mirror comprising:
- a housing supporting a mirrored element and defining an interior cavity;
- a support shaft extending through said interior cavity and having end portions attachable to a vehicle;
- a drive motor supported within said interior cavity; and
- drive coupling means having a threaded shaft defining first and second oppositely threaded portions, first and second threaded shuttles received upon said first and second threaded portions respectively and linkage means coupled between said first and second threaded shuttles and said support shaft pivoting said housing in response to operation of said drive motor.

9. A powered vehicle mirror as set forth in claim 8 wherein said linkage means includes a first arm extending from said support shaft and second and third arms pivotally coupled between said first arm and said first and second threaded shuttles respectively.

10. A powered vehicle mirror as set forth in claim 9 further including brake means for imparting a braking force between said housing and said support shaft to resist pivotal motion of said housing.

11. A powered vehicle mirror as set forth in claim 10 wherein said brake means includes:
- a brake plate extending outwardly from said support shaft;
- a pair of brake pads supported on opposite sides of said brake plate; and
- means for captivating said brake plate between said brake pads.

12. A powered vehicle mirror as set forth in claim 11 wherein said means for captivating includes: a pivotal arm supporting one of said brake pads; a spring urging said pivotal arm toward closure of said brake pads; and a solenoid operative when energized to pivot said pivotal arm away from closure of said brake pads.

13. A powered vehicle mirror as set forth in claim 11 wherein said means for captivating includes spring means coupled between said brake pads to force said brake pads against said brake plate.

* * * * *